May 9, 1967      B. M. GIFFORD      3,318,567
BUTTERFLY VALVE AND METHOD FOR CONSTRUCTING THE SAME
Filed May 22, 1964      5 Sheets-Sheet 1
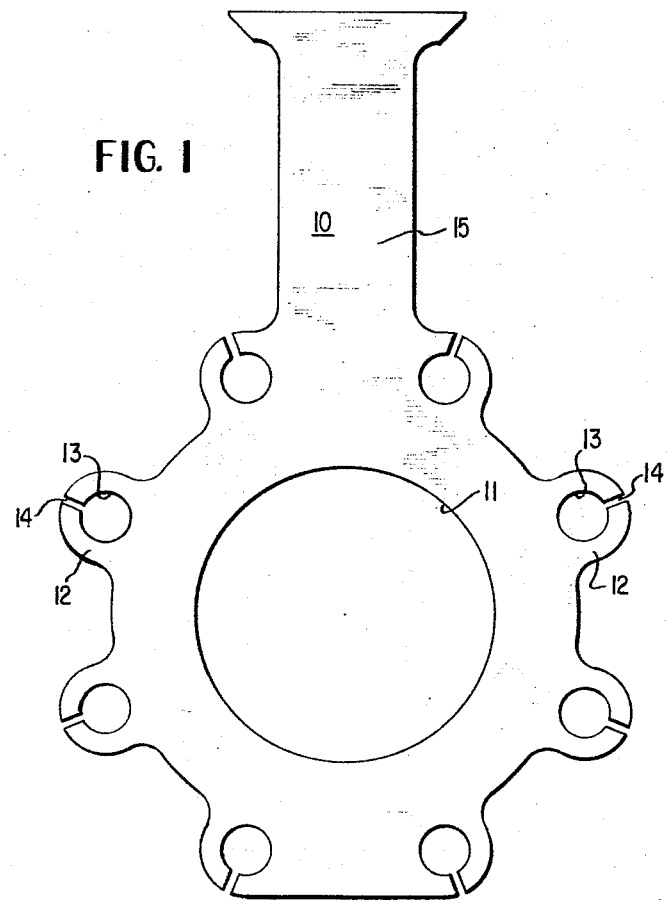
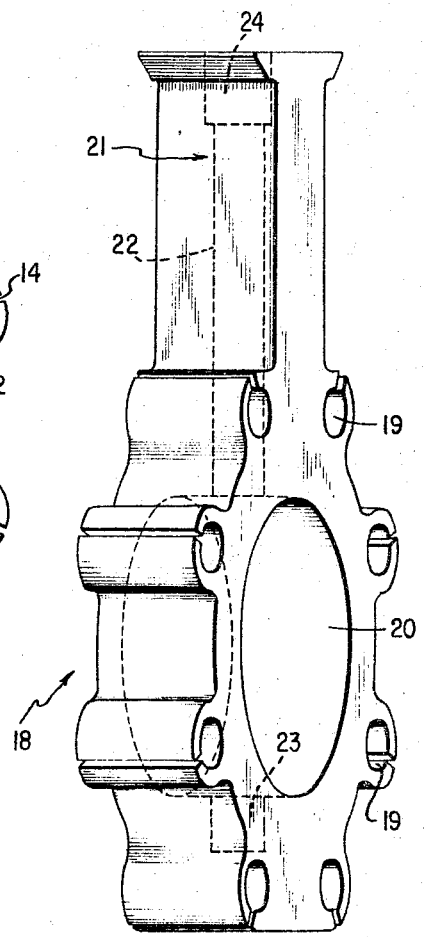
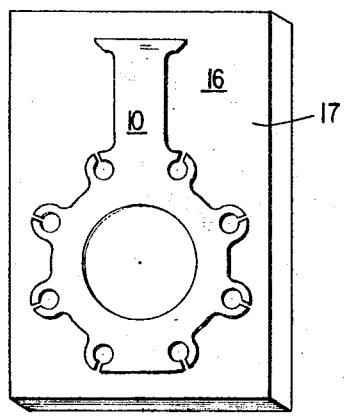
INVENTOR.
BRUCE M. GIFFORD
BY *Diggins and O'Boyle*
ATTORNEYS.

May 9, 1967  B. M. GIFFORD  3,318,567
BUTTERFLY VALVE AND METHOD FOR CONSTRUCTING THE SAME
Filed May 22, 1964  5 Sheets-Sheet 3

INVENTOR.
BRUCE M. GIFFORD
BY Diggins and O'Boyle
ATTORNEYS.

May 9, 1967  B. M. GIFFORD  3,318,567
BUTTERFLY VALVE AND METHOD FOR CONSTRUCTING THE SAME
Filed May 22, 1964  5 Sheets-Sheet 4
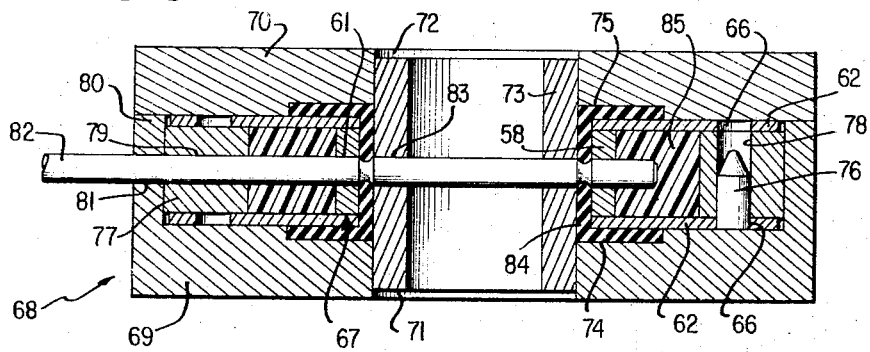
FIG. 8
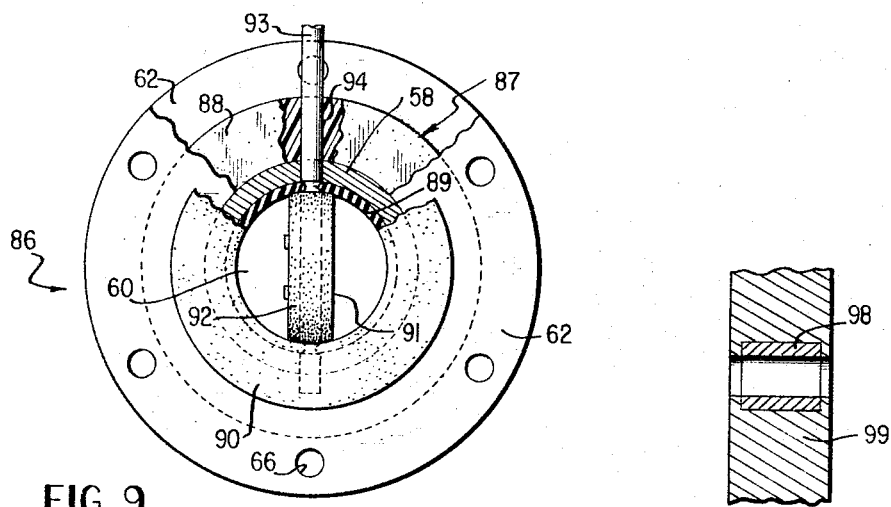
FIG. 9
FIG. 11
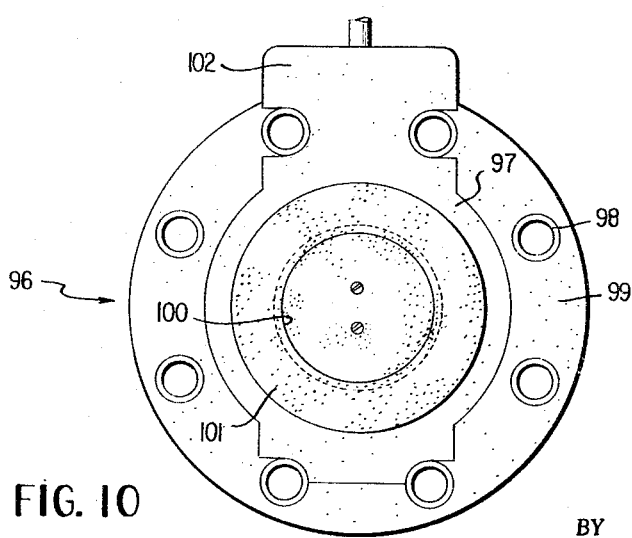
FIG. 10
INVENTOR.
BRUCE M. GIFFORD
ATTORNEYS.

May 9, 1967 B. M. GIFFORD 3,318,567
BUTTERFLY VALVE AND METHOD FOR CONSTRUCTING THE SAME
Filed May 22, 1964 5 Sheets-Sheet 5

INVENTOR.
BRUCE M. GIFFORD
BY
Diggins and O'Boyle
ATTORNEYS.

3,318,567
BUTTERFLY VALVE AND METHOD FOR CONSTRUCTING THE SAME
Bruce M. Gifford, Houston, Tex., assignor to Mono Valve Corporation, Conroe, Tex., a corporation of Texas
Filed May 22, 1964, Ser. No. 369,553
17 Claims. (Cl. 251—306)

This invention relates to butterfly valves generally, and more particularly ot a novel and improved butterfly valve and method and apparatus for constructing the same.

The butterfly valves commonly employed in both gas and liquid systems are basically constructed from a cast valve housing which is provided with integral cast flanges at opposite ends thereof to facilitate the attachment of the housing to a pipeline or other fluid conduit. A central fluid passage is formed in the valve housing and receives a valve disc for controlling fluid flow through the central passage. This valve disc is actuated by means of a valve shaft which is mounted in an opening extending through the valve housing into the central fluid passage.

To provide a fluid impervious seal and seat for the valve disc, a pre-formed insert is normally pressed or bonded within the central fluid passage. Ideally, this insert should conform accurately to the peripheral configuration of the valve disc to insure efficient sealing.

In the construction of conventional butterfly valves, numerous difficulties have been encountered which preclude the production of a low cost but efficient butterfly valve unit. For example, valve housings formed by a casting process often crack or emerge from the casting step with voids or other inherent defects which render them completely unsuitable for use or which, at best, necessitate additional machining and repair steps to render the casting suitable for use as a valve housing.

In the formation of a butterfly valve housing from a rough casting, the cast central fluid passage requires extremely accurate machining before the pre-formed insert is placed therein. Often, the central fluid passage in a rough casting is off center with respect to the body of the valve housing, and must be excessively machined to render the housing suitable for use.

The pre-formed insert forming the valve seat for the valve disc in a conventional butterfly valve is a major source of valve malfunction, for to operate efficiently, such inserts should closely conform to the outer configuration of the valve disc. In usual practice, however, this insert often assumes the configuration of the walls of the central fluid passage, and is thereby subjected to any imperfections or irregularities remaining in the walls of the central fluid passage subsequent to the machining operation. Also, when the pre-formed valve inserts of conventional butterfly valves are subjected to fluid pressure, deformation often results which forces the insert away from the wall of the central fluid passage, causing a "ballooning" phenomena.

With cast butterfly valve housings, it is not only necessary to accurately machine the walls of the central fluid passage, but additionally the cast flanges formed at the opposite ends of the valve housing must also be accurately machined and bolt holes subsequently formed therein. These bolt holes, which permit the attachment of the valve housing to a fluid system, may not be formed during the casting process, for such holes must be accurately positioned relative to the central fluid passage to assure alignment of the valve with the components of the fluid system to which it is attached. Therefore, mis-alignment between the central fluid passage and the bolt holes provided in the housing flanges, could render the butterfly valve unsuitable for use in a fluid system.

The numerous machining operations required in the manufacture of conventional butterfly valves and the extreme degree of accuracy which must be exercised during such machining operations, result in high production costs which preclude the marketing of an inexpensive butterfly valve. Also, the employment of rough-cast valve housings which necessitates a number of individual machining steps for the formation of each single valve unit, prevents the achievement of uniformity between butterfly valve units of the same general type, thereby rendering it impossible to accurately determine within close tolerances the various performance capabilitites of butterfly valves of the same type. The individual casting and machining of each valve tends to alter the capabilities of such valve with respect to the capabilities possessed by similarly constructed butterfly valves.

A very important development which has contributed to the provision of a lower cost, high efficiency, butterfly valve is the replacement of the pre-formed insert which forms the seat for the valve disc by a molded-in-place rubber valve seat. This development in butterfly valve seat manufacture, which is illustrated by United States Letters Patent Nos. 3,050,781 and 3,122,353, provides a means for minimizing the machining required for the central fluid passage of a cast valve housing while insuring the provision of a valve seat which accurately conforms to the outer periphery of the valve disc. By employing the concept of molding a valve seat within cast valve housing, an improved butterfly valve may be produced at lower cost, for the molded valve seat is not subject to the "ballooning" and other operational defects which existed with the previously known valve inserts, while production costs are cut by elimination of the requirement for extensive machining of the central fluid passage.

Although the use of a molded valve seat in the rough cast housing of a butterfly valve eliminates many of the production costs previously incurred in the manufacture of conventional butterfly valves, several of the disadvantages experienced in the manufacture of such conventional cast valves are still prevalent in butterfly valves formed with rough-cast housings and molded valve seats. While the machining of the central valve passage is substantially eliminated by the molded valve seat, it is still necessary to machine each of the cast flanges provided at opposite ends of the valve housing and to employ a machining operation to form bolt openings in these flanges. It is still difficult to accurately position the machined bolt openings with respect to the central fluid passage, and the employment of a cast valve housing still defeats the possibility of achieving uniformity in valves of the same type for each separate valve casting contains inherent defects and individual physical features which govern the operational characteristics of the valve formed from such casting.

It is a primary object of this invention to provide a new and improved butterfly valve and method for constructing the same.

It is another object of this invention to provide a new and improved butterfly valve which may be inexpensively constructed in a manner wherein valves of the same type will exhibit substantially the same performance characteristics.

It is a further object of this invention to provide a new and improved butterfly valve incorporating a valve housing construction which is not subject to the irregularities and defects prevalent in butterfly valves having rough-cast valve housings.

It is another object of this invention to provide a new and improved butterfly valve which combines both the structural advantages attained through the use of a rigid, non-moldable valve housing with the manufacturing advantages resulting from the fabrication of a valve structure from a relatively soft, moldable material.

A further object of this invention is to provide a new and improved butterfly valve having a valve housing which incorporates a substantially rigid, unitary structural unit for providing structural support for molded housing sections.

Another object of this invention is to provide a novel and improved method for forming a butterfly valve which employs molding techniques to replace the machining operations previously necessitated by cast valve housings.

A further object of this invention is to provide a novel and improved method for forming a butterfly valve which employs molding techniques to vary the structural characteristics of the valve housing.

Another object of this invention is to provide a novel and improved method for forming a butterfly valve which includes constructing a basic valve housing configuration from a first structural element and subsequently employing molding techniques to form the finished housing configuration without an extensive machining operation.

A still further object of this invention is to provide a new and improved method and apparatus for forming butterfly valves without resorting to excessive machining operations.

With the foregoing and other objects in view, the invention resides in the following specification and appended claims, certain embodiments and details of construction of which are illustrated in the accompanying drawings in which:

FIGURE 1 is an elevational view of a template used in the method of the present invention;

FIGURE 2 is a perspective view of the template of FIGURE 1 mounted on a sheet of material;

FIGURE 3 is a perspective view of the valve housing section of the present invention;

FIGURE 8 is a sectional view of a modified mold assembly of the present invention;

FIGURE 9 is a partially cutaway elevational view of a modified butterfly valve of the present invention;

FIGURE 10 is an elevational view of an embodiment of the butterfly valve of the present invention;

FIGURE 11 is a sectional view of an imbedded grommet of FIGURE 10.

Figure 4:
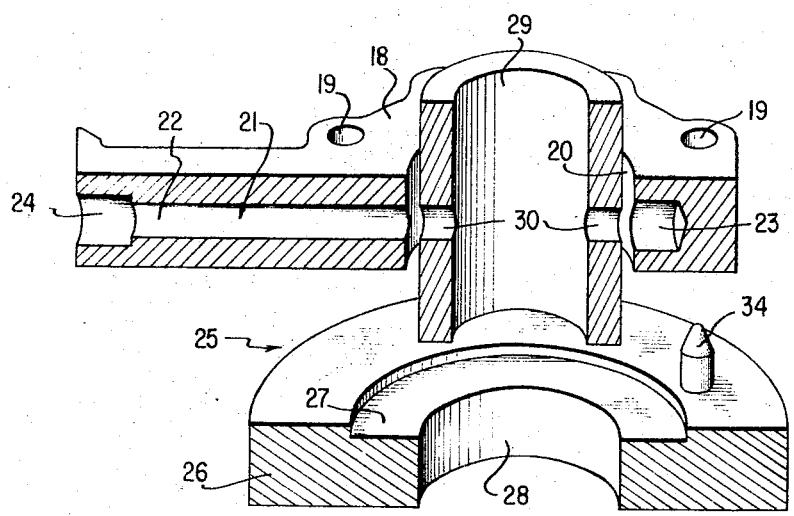
FIGURE 4 is an exploded sectional view of portions of the mold assembly of the present invention.

The unique features of the improved butterfly valve of the present invention may be best understood by first tracing the steps involved in the novel method by which such valve is formed. Unlike conventional butterfly valves, the butterfly valve of the present invention does not require the employment of casting techniques in the formation of the valve housing. Instead, this invention provides a novel method for forming a butterfly valve housing which initially begins with the use of a template, drawing, blueprint, or other similar master pattern to define the desired valve housing configuration. For purposes of illustration, FIGS. 1 through 3 show the implementation of the initial steps of this butterfly valve forming method through the use of a template 10 as a master pattern. Template 10 is formed to the desired general configuration of the butterfly valve housing to be ultimately constructed and includes a central circular opening 11 which defines the unfinished perimeter of the central fluid passage which will extend through the valve housing. The periphery of the template 10 is formed with a plurality of laterally extending projections 12 which are provided with centrally formed openings 13. The openings 13 define the position of the bolt openings which will be cut in the butterfly valve housing, and these openings are accurately positioned with respect to the central opening 11. The particular template illustrated by FIG. 1 is intended for use in a flame-cutting operation, and therefore the peripheral edges of the openings 13 in the projections 12 terminate at an outwardly extending slot 14 so that the complete valve housing configuration defined by the template may be formed in a single flame-cutting step without necessitating the separate formation of each individual bolt hole.

In addition to the projections 12 provided at the periphery of the template 10, a single, larger projection 15 extends laterally from the upper portion of the template. This projection is designed to define the configuration of the butterfly valve shaft support.

To accomplish the first step in the formation of the butterfly valve of the present invention, the template 10 is placed upon a section of sheet material 16, and the sheet material is then cut to the configuration of the template. Sheet 16 may be formed from any substantially rigid, hard sheet material, but for most valve constructions, sheet 16 will comprise a metallic sheet. It has been found, for example, that a very desirable butterfly valve may be obtained if the sheet 16 constitutes a steel sheet which is flame-cut to conform to the configuration of the template 10, for a steel valve housing is not subject to the freezing or cracking often suffered by cast iron housings.

It is quite apparent that many various cutting methods may be employed to cut any one of many desired valve housing patterns from the sheet 16, and the cutting method best suited for use with the specific sheet material used may be chosen. Additionally, the template 10 may be replaced by numerous types of patterns suitable for use with certain cutting methods or apparatus. For example, a blueprint or drawing may form the pattern for the cutting of the sheet 16 and can be used in cooperation with various blueprint or drawing readers known to the art which in turn operate to control a sheet-cutting unit. With such cutting units, a number of patterns may be cut from a sheet 16 in a single cutting operation.

The basic valve housing section 18 illustrated by FIG. 3 which results from the cutting of the sheet 16 is far superior to the castings previously employed in the construction of butterfly valve housings. Not only does the housing section 18 include accurately positioned bolt holes 19 and a central fluid passage 20 which require no additional machining, but such housing section is also devoid of cracks, voids, or other imperfections commonly found in rough castings. The only machining operation required to prepare the housing section 18 for subsequent steps in the butterfly valve construction method of the present invention is the drilling of a passage 21, indicated in dotted lines in FIG. 3, into the central fluid passage 20, for the subsequent reception of a valve shaft.

Passage 21 has an upper section 22 positioned above the central fluid passage 20 and a lower section 23 diametrically aligned with upper section 22 and positioned below the central fluid passage 20. Upper section 22 extends through the outer surface of the housing section 18 while the lower section 23 terminates before reaching the outer surface of the housing section. The outer extremity of the upper section 22 is of a greater diameter than the remainder of the channel, as is indicated at 24, to provide space for the insertion of sealing units for the valve shaft.

After the passage 21 is machined in the housing section 18, the housing section is subjected to a molding operation to accomplish the formation of a valve seat integrally molded in place within the fluid passage 20. This molding operation accomplishes the dual purpose of finishing the interior surface of the fluid passage 20 to an exact desired dimension without the employment of a machining operation while forming an integral valve seat within the fluid passage.

Figure 5:
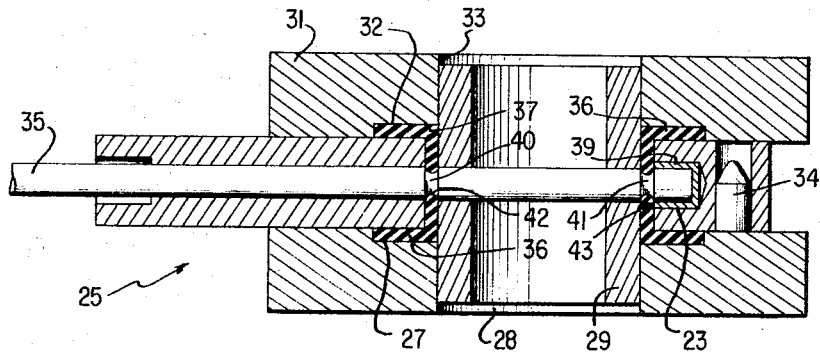
FIGURE 5 is a sectional view of the mold assembly of FIGURE 4.

The molding steps accomplished during the formation of a valve seat for the fluid passage 20 may best be understood with reference to FIGS. 4 and 5, which illustrate a mold assembly 25 that may be employed to complete the seat molding operation. Mold assembly 25 includes a lower molding plate 26 having an annular identation or cavity 27 in the upper surface thereof which surrounds the periphery of a central opening 28. The lower molding plate 26 cooperates with a mold core 29 which includes a central opening 30 extending transversely therethrough and a upper molding plate 31 having a structural configuration substantially identical to that of the lower molding plate 26. Upper molding plate 21 also includes an annular cavity 32 surrounding a central opening 33.

To complete the molding of a valve seat in the fluid passage 20 of the housing section 18, the housing section is first placed upon the lower molding plate 26. To aid in properly positioning the housing section with respect to the lower molding plate, a pin 34 projects upwardly from the surface of the lower molding plate and is designed to enter one of the bolt openings 19 formed in the housing section 18.

With the housing section 18 resting upon the surface of the lower molding plate 26, the core 29 is inserted into the central fluid passage 20 and the central opening 28 of the lower molding plate. The core 29 is formed to fit snugly within the central opening 28 but must also be capable of both rotational and lateral movement relative to the lower molding plate 26. This movement of the core 29 is necessary to insure complete alignment of the housing section 18 within the mold assembly 25, for the passage 21 is drilled through the housing section without regard to any specific correlation between its position and the position of the remaining elements of the housing 18, and it would therefore often prove impossible to align the core 29 with the passage 21 if the core was fixed to either the upper or the lower molding plates of the mold assembly 25. However, with the provision of the floating or movable core, the core may be moved relative to the lower molding plate 26 until the passage 30 in the core aligns with the passage 21 in the housing section 18. When this alignment is achieved, a dummy shaft 35 is inserted through the upper section 22 of the passage 21, the passage 30, into the lower section 23 of the passage 21. With the dummy shaft in place, the core 29 is accurately located with relation to the passage 21 in the housing section 18 and is also accurately centered with respect to the bolt openings 19.

If desirable, the surfaces of the housing section 18 in contact with the moldable material 36 may be first coated with a suitable primer or bonding material to enhance the bond formed during the molding of the material 36. It will be noted, with reference to FIGURE 5, that the diameter of the core 29, although substantially equal to the diameter of the central openings 28 and 33 in the lower and upper molding plates, is less than the diameter of the central fluid passage 20 in the housing section 18 so that a resultant cavity 37 is formed. Subsequent to the positioning of the housing section 18, the lower molding plate 26, and the core 29, a moldable material 36 which will form a relatively resilient valve seat is placed within the cavity 37 between the outer surface of the core 29 and the surface of the central fluid passage 20 and also on the portions of the housing section 18 which correspond to the cavities 27 and 32 in the lower and upper molding plates 26 and 31.

After the moldable material 36 has been placed within the mold assembly 25, the upper molding plate 31 is positioned upon the housing section 18 with the upper portion of the core 29 extending through the central opening 33 of the upper molding plate. The core 29, although movable relative to the upper molding plate, accurately maintains the upper molding plate in alignment with the lower molding plate 26. The entire molding assembly 25 is then subjected to the heat or pressure necessary to achieve the curing of the moldable material 37. Any pressures involved in the molding operation do not affect the position of the core 29 which is suspended upon the dummy shaft 35 for the core is held in place by the upper and lower molding plates 31 and 26.

During the assembly of the molding plates and the housing section 18, a shaft bearing 39 may be placed in the lower portion 23 of the passage 21. The dummy shaft 35 employed to support the core 29 may then be formed with indentations or grooves 40 and 41 positioned adjacent the outer surfaces of the core 29 so that during the molding operation, dummy shaft indentations 40 and 41 become filled with moldable material 36 and form fluid impervious shaft gaskets or seals 42 and 43. Shaft gasket 43 operates to hold the bearing 39 in place within the lower portion 23 of the passage 21.

Upon the completion of the molding operation, the dummy shaft 35 is removed from the mold assembly and the passage 21 of the housing section 18, and the molding assembly 25 is disassembled. The housing section 18 is now prepared for the final assembly operation which results in the formation of the butterfly valve 44 of FIG. 6.

Figure 6:
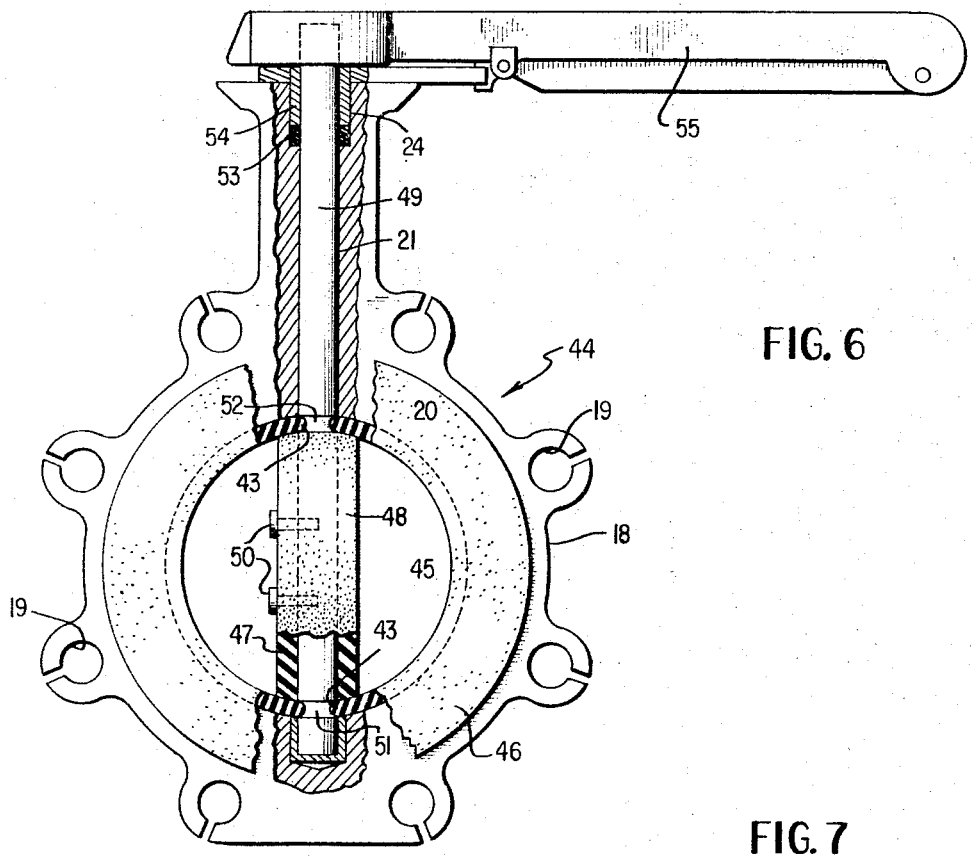
FIGURE 6 is a partially cutaway elevational view of the butterfly valve of the present invention.

It will be noted from FIG. 6 that the molding process has provided the housing section 18 with a valve seat 45 which forms a lining layer for the surface of the central fluid chamber 20. Also, the molding process has provided a gasket 46 extending annularly about the central fluid passage 20 on the parallel end faces of the housing section 18.

To complete the construction of the butterfly valve 44, a valve disc 47 is coated by a conventional molding process with a coating 48 of moldable material to provide a valve disc having a diameter equal to the internal diameter of the valve seat 45.

Subsequent to the molding of the valve disc 47, a valve shaft 49 is inserted into passage 21, and the molded valve disc 47 is secured thereto by means of bolts 50 or other suitable securing means. The valve shaft 49 may be provided with grooves 51 and 52 which receive the molded shaft gaskets 42 and 43 and effectively seal the shaft against fluid leakage. Additional gaskets may be provided about the shaft within the enlarged portion 24 of the shaft passage 21 as indicated at 53, and the gasket 53 may be held in place by a press-fitted bearing 54. A handle 55 may then be secured to the upper end of the valve shaft 49 to facilitate manual operation of the valve disc 47.

When the butterfly valve 44 is secured to a fluid line by means of bolts inserted through the bolt holes 19 in the housing section 18, the gaskets 46 on the parallel faces of the housing section 18 are pressed in sealed relationship with the fluid line to effectively seal the valve 44 within the fluid system to which it is attached.

Figure 7:
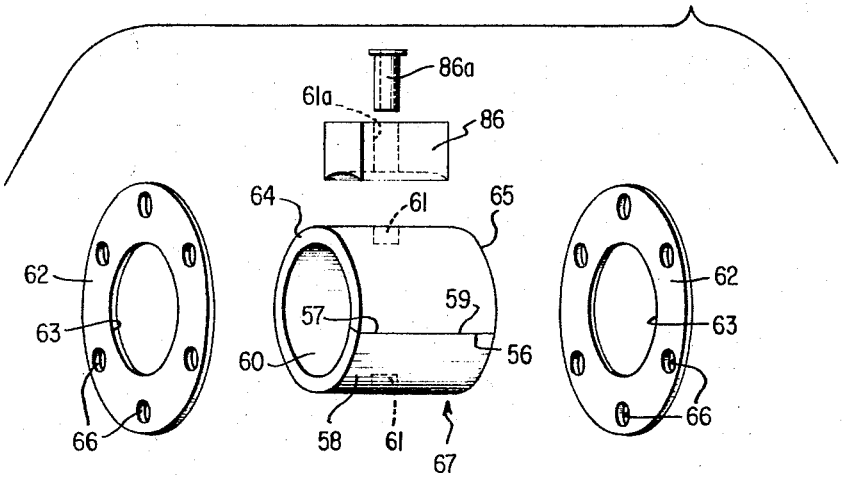
FIGURE 7 is an exploded perspective view of a modified valve housing section of the present invention.

By employing the novel method of the present invention to construct a butterfly valve through the formation of basic valve housing section from sheet material and the utilization of a molding process to determine the finished structural characteristics of the valve housing, a number of highly efficient butterfly valves having varying constructional characteristics may be economically produced. For example, a variation of the previously disclosed method for forming a butterfly valve is illustrated by FIGS. 7–9. In accordance with this method, the opposed ends 56 and 57 of a flat section of sheet material 58 are joined by welding, bonding, or other suitable means, along the line 59 to define an enclosed fluid conduit 60. Two diametrically aligned openings 61 are then drilled through the sheet material 58 to provide an opening for the subsequent reception of a valve shaft.

Two end flanges 62 provided with a central aperture 63 having a diameter equal to the diameter of the enclosed fluid passage 60 are then formed from sheet material and welded or otherwise suitably bonded to the end surfaces 64 and 65 of the sheet 58. The end flanges 62 are provided with aligned bolt openings 66 and when secured to the sheet 58, form a basic valve housing section indicated generally at 67.

The basic housing section 67 is subjected to a molding operation in a mold assembly 68 which is very similar to the mold assembly illustrated in FIG. 5. Mold assembly 68 includes a bottom molding plate 69 and a top molding plate 70 which are provided with central openings 71 and 72 having a diameter substantially equal to the outside diameter of a floating core member 73. Also, similarly to the molding plates of FIG. 5, the upper and lower molding plates 69 and 70 of the molding assembly 68 are provided with annular grooves 74 and 75 which surround the periphery of the central openings 71 and 72.

To complete a molding operation employing the molding assembly 68, a molding ring 77 may be inserted between the flanges 62 of the valve housing section 67. Molding ring 77 contains apertures 78 corresponding to the bolt openings 66 in the flanges 62 and also contains a shaft opening 79.

With the molding ring 77 is place between the flanges 62, the housing section 67 is positioned upon the lower molding plate 69 so that a pin 76 projecting from the surface of the lower molding plate will be inserted in a bolt opening 66. The lower molding plate 69 is provided with an upright side wall 80 which extends upwardly for a distance substantially equal to the longitudinal dimensions of the housing section 67. This side wall 80 operates as a support for the molding ring 77, and includes an opening 81 through which a dummy shaft 82 may be inserted. Dummy shaft 82 is inserted through the opening 81 in the side wall of the lower molding plate 69, the shaft opening 79 in the molding ring 77, the aligned openings 61 in the housing section 67, and a shaft opening 83 in the core 73. The insertion of the dummy shaft 82 aligns the floating core 73 within the central opening of the lower molding plate 69 in the manner previously described with respect to the molding assembly 25 of FIG. 5.

The side wall 80 of the lower molding plate 69 and the molding ring 77 each contains a second aperture (not shown) similar to the openings 81 and 79 to facilitate the injection of the moldable material between the molding ring and the outer surface of the sheet material 58 subsequent to the insertion of the dummy shaft 82. This moldable material, indicated at 85 in FIG. 8, will form a hard, anti-corrosive layer on the outer portion of the finished butterfly valve housing, and may comprise any suitable plastic, polymer, or corrosion-resistant moldable material.

Subsequent to the injection of the material 85 into the molding assembly 68, a resilient moldable material 84 is placed within the cavities between the floating core 73 and the wall of the fluid conduit 60 which is formed by the inner surface of the sheet material 58. Additionally, this moldable resilient material 84 is also placed in the cavity 74 in the lower molding plate 69 and on the outer surfaces of the housing flanges 62 which will be covered by the cavity 75 in the upper mold plate 70. The upper mold plate 70 is then moved into place about the floating core 73, and the molding process is accomplished in the manner described with regard to the mold assembly 25 of FIG. 5. During such molding process, both the molding material 85 and the resilient molding material 84 are cured and bonded to the adjacent surfaces of the valve housing section 67.

The butterfly housing formed by the molding assembly 68 may be assembled with a molded valve disc and a valve shaft in the manner previously described with respect to the butterfly valve 44 of FIG. 6 to complete the unique butterfly valve construction shown by FIG. 9. Referring to FIG. 9 the butterfly valve includes a valve housing 87 which is formed by an outer layer of corrosion-resistant molded material 88, the supporting layer of sheet material 58, and a molded valve seat 89. Also, the flanges 62 of the housing 87 are provided with resilient molded gaskets 90 surrounding the periphery of the central fluid passage 60.

A valve disc 91 covered with a molded-in-place layer of resilient material 92 is secured to a valve shaft 93 which extends into the central fluid passage 60. Valve shaft 93 passes through the aligned openings 61 into the sheet material 58 and also through an opening 94 in the outer housing layer 88 and an opening 95 in the valve seat 89 formed by the withdrawal of the dummy shaft 82 from the molding assembly 68.

In forming a butterfly valve of the type illustrated by FIG. 9 employing the molding assembly 68 of FIG. 8, a large number of valves having various operational characteristics may be rapidly constructed. This is achieved by employing flanges 62 of a standard size, as illustrated by FIG. 7, and forming the enclosed fluid conduit with the sheet material 58 to cooperate with such flanges to provide a basic housing section 67. With this basic housing section, the molding operation achieved with the molding assembly 68 may be altered to produce valves of varying sizes which exhibit a number of structural characteristics. For example, a factor which often proves of critical importance in the formation of a butterfly valve is the size of the valve shaft required to operate the valve disc. It is difficult to mass produce butterfly valves of any specific size, for the size of the valve shaft required in each individual valve often depends upon conditions which vary in accordance with the type of fluid system in which the valve is to be used. To overcome these variables and achieve complete versatility, a metallic block 86 may be welded or otherwise secured to the valve housing section 67 (FIG. 7) during the formation thereof, and the aligned opening 61 for the valve shaft is then formed to extend through the block 86 as shown at 61a. By forming opening 61 through the block 86 and the housing section 67 of a circumference sufficient to permit the insertion of the largest desirable valve shaft through the housing section 67, it is then possible to economically adapt the housing section to smaller shaft sizes by inserting a bushing 86a having an internal diameter which is less than the diameter of the shaft opening 61 into the opening 61a in the block 86.

In some fluid systems the housing 87 must be able to withstand high fluid pressures, so in the formation of the housing for valves to be used in such systems, the size of the molding ring 79 may be varied to alter the thickness of the molded anti-corrosive outer valve housing layer 88. The thickness of this outer housing layer and the material from which it is formed determine, to a great extent, the characteristics of the final valve housing, and by increasing the thickness of the outer housing layer 88, the resultant butterfly valve will be enabled to withstand increased fluid pressures.

Additionally, by altering the diameter of the floating core 73, the thickness of the valve seat 89 will be correspondingly varied so that, by forming a thicker valve seat, a valve disc 92 of smaller diameter may be employed within the butterfly valve 86. It therefore becomes apparent that butterfly valves of various sizes may be constructed by employing the basic valve housing section 67 of FIG. 7 with molding rings 79 and cores 73 of diverse sizes within the molding assembly 68. With this unique method, it is possible to use the varying durometers or hardnesses of rubber and plastic in the same mold to vary the pressure-holding ability of a valve constructed from the basic housing section 67 of FIG. 7. The polymer or other moldable material employed for the anti-corrosive outer layer 88 of the valve 86 of FIG. 9 performs not only its primary function of protecting the metal housing section 67 from corrosion, but also operates as a structural member in absorbing pressure and providing an equalization of the unmachined outer surface of the housing section to maintain a high degree of valve uniformity.

The novel method and molding apparatus of the present invention is extremely versatile and may be employed with numerous modifications to construct butterfly valves having diverse structural capabilities and configurations. The valve housing unit formed from a sheet of material may be cut to any pattern, as exemplified by the butterfly valve 96 of FIG. 10. The valve housing section 97 of the valve 96 was formed from sheet material by the method previously described, and it will be noted that this housing section is circular in configuration and contains no bolt openings. To form bolt openings in the valve 96, the housing section 97 is placed in a mold assembly similar to the mold assembly 68 of FIG. 8 and circular grommets 98 are placed upon pins, similar to the pin 66 of FIG. 8 which extend upwardly from the lower molding plate of the mold assembly.

With the housing section 97 and the grommets 98 in position within a modified mold assembly similar to mold assembly 68 of FIG. 8, a molding operation of the type previously described in connection with FIG. 8 is performed to simultaneously mold an outer surface 99 and a resilient valve seat 100 and gasket 101 onto the housing section 97. Additionally, with a molding operation of this type and a slightly modified mold assembly, it is also possible to coat the outer surfaces of the mold housing 97 with a thin coating of the anti-corrosive moldable material employed to form the outer layer 99. This thin coating of material formed on the housing 97 is indicated at 102.

When the housing section 97 of the valve 96 is removed from the mold, the grommets 98 will be firmly imbedded in the anti-corrosive layer 99 to form aligned bolt holes for the butterfly valve. These grommets are slightly recessed within the layer 99, as indicated by FIG. 11, so that the outer layer 99 on the housing section 97 may act as a gasket in cooperation with the gasket 101 to seal the valve 96 within a fluid system.

It is very desirable to completely coat a butterfly valve with material which is not subject to corrosion, rust, or other types of deterioration which might be caused by elements present in the specific environment where the valve is to used. By employing the novel method and apparatus of the present invention, it is possible to economically produce a butterfly valve with no exposed metal parts, and with this method, a valve may be custom coated with a layer of material which is particularly resistive to specific deteriorating agents which prevail in the environment where the valve is to be employed.

Figure 12:
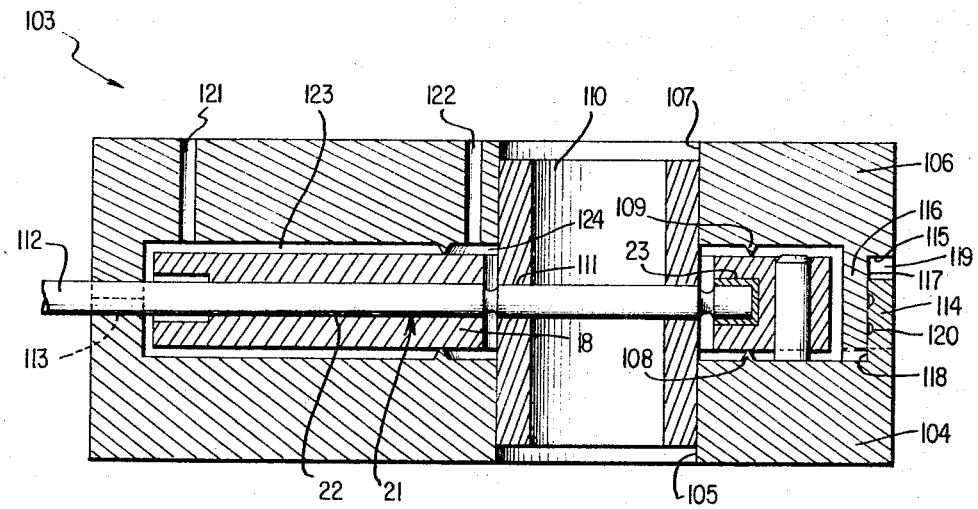
FIGURE 12 is a sectional view of a modified mold assembly of the present invention.

Referring now to FIG. 12, a modified mold assembly indicated generally at 103, is specifically adapted to produce a completely coated butterfly valve from any of the valve housing sections constructed in accordance with the present invention, as previously described. Like the mold assemblies of FIGS. 5 and 8, mold assembly 103 includes a bottom molding plate 104 having a central aperture 105 and a top molding plate 106 having a central aperture 107. The bottom molding plate 105 is provided with a circular upstanding ridge indicated at 108, which is spaced from the periphery of the central aperture 105, and the top molding plate 106 is provided with a similar ridge 109. Ridges 108 and 109 act as supports to space the molding plates 104 and 106 from the surface of the metal valve housing section to be molded. For purposes of illustration the housing section in FIG. 12 is shown as being the valve housing section 18 of FIG. 3.

During the molding operation, the mold assembly 103 operates in a manner very similar to that described with respect to the mold assemblies 25 and 68 of FIGS. 5 and 8. The housing section 18 is positioned upon the upstanding ridge 108 of the bottom molding plate 104, and a floating core unit 110 having a shaft receiving passage 111 extending therethrough is positioned within the central aperture 105 in spaced relationship with the wall of the fluid passage 20 in the housing section 18. A dummy shaft 112 is then inserted through an aperture 113 in the mold assembly 103, the upper passage portion 22 of the shaft passage 21 in the housing section 18, the shaft aperture 111 in the floating core 110, adn into the lower passage section 23 of the housing section 18.

With the dummy shaft 112 in place, the floating core 110 is positioned within the lower molding plate 104 and is aligned with respect to the bolt holes 19 in the housing section 18 as previously described with respect to FIG. 5. The mold assembly 103 is now prepared to receive the top molding plate 106.

It must be noted that the bottom molding plate 104 is provided with an upstanding side 114 which, when the top molding plate 106 is moved into position, projects into a cutaway portion 115 formed in a side wall 116 of the top molding plate. As the top molding plate 106 is lowered onto the bottom molding plate 104 until the ridge 109 rests upon the housing section 18, the side wall 114 of the bottom molding plate projects into the cutaway portion 115 so that an inner surface 117 of the side wall 114 is in contact with an outer surface 118 of the side wall 116.

The top molding plate 106 is constructed so that when the ridge 109 contacts the housing section 18, a space indicated at 119 will remain between the side walls 116 and 114 to permit expansion or contraction between the molding plates 104 and 107 while contact is maintained between the surfaces 117 and 118. To provide a seal between the top and bottom molding plates 104 and 106 during the molding operation, grooves 120 may be cut in the surface 117 of the side wall 114.

The top molding plate 106 is provided with inlet passages 121 and 122 for molding material. Passage 121 communicates with a mold cavity 123 which is formed at the outer portion of the mold assembly 103 outwardly of the circular ridges 108 and 109, while inlet passage 122 communicates with a mold cavity 124 formed inwardly of the circular ridges 108 and 109. When the mold assembly 103 is prepared for molding operation, the mold cavities 123 and 124 extend completely about the outer surfaces of the housing section 18.

Elastomeric material may be introduced through the input passage 122 to form a valve seat and outer gasket on the housing section 18 in the manner previously described with respect to FIG. 5, while a polymer or other corrosion-resistant material may be introduced through the input passage 121 to coat the remaining portions of the housing 18. During this molding operation, some relative movement may occur between the surfaces 117 and 118 of the side walls 114 and 115, but molding material from within the cavity 123 which may be forced between the surfaces 118 and 117 fills the grooves 120 and hardens to form a seal for the molding assembly 103.

A mold assembly of the type illustrated by FIG. 12 may be effectively employed with any of the metal valve housing sections previously illustrated to produce a completely coated butterfly valve housing having no exposed metal parts. It is quite apparent that any desirable molding material may be used to protect the valve housing against specific corrosive agents.

Figure 13:
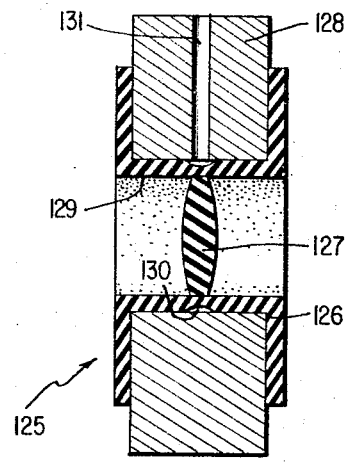
FIGURE 13 is a sectional view of a modified valve seat construction.

By employing the methods of the present invention to construct a butterfly valve with a molded valve seat and a molded outer surface disposed over a metallic structural housing section, it is possible to alter the valve construction process to economically achieve numerous variations in the overall valve structure. FIG. 13 illustrates one of these variations wherein the molded valve seat is constructed to facilitate the application of fluid pressure to a circular section of the seat to provide an improved fluid seal. In prior butterfly valve units it has been common to add pneumatic tubes or similar devices to the valve seat unit so that the valve seat may be subjected to pressure to form a positive seal between the seat and the valve disc. Such pressure sealing arrangements have necessitated the addition of extra components to the seat structure of the butterfly valve, and often special machining operations are necessary to adapt the valve housing for the reception of these components.

With the method of the present invention, a pressurized valve seat may be provided with little or no additional expense. The construction of this valve seat may best be understood with reference to FIG. 13 which illustrates a butterfly valve 125 having a molded seat 126 which is especially adapted to provide a pressure seal for a valve disc 127. Valve 125 includes a metallic valve housing secton 128 which is formed to defined a fluid conduit 129. The molded valve seat 126 is bonded to the wall of the fluid conduit 129 and to a portion of the outer surface of the housing section 128 by the molding process previously described. However, to provide a passage for fluid pressure beneath the valve seat 126, the bond between the valve seat and the housing section 128 is prevented from occurring in a circular section 130 which extends beneath the seat 126 around the circumference of the fluid conduit 129. This unbonded section 130 is positioned within the conduit 129 inwardly of the input and output openings of the conduit. A pressure input passage 131 is cut through the valve housing 128 into the unbonded section 130 to facilitate the introduction of fluid pressure beneath the valve seat 126. The valve disc 127 is positioned within the fluid conduit 129 so that fluid pressure introduced into the pressure inlet 131 and around the circumference of the fluid conduit 129 in the section 130 will cause the valve seat 126 to seal against the valve disc.

The unbonded section 130 of the valve seat 126 may be easily formed during the valve seat molding operation by treating the fluid conduit wall adjacent this section in a manner to preclude the bonding of the valve seat 126 thereto. In cases where a primer or other bonding material is first applied to the surface of the housing section 128 before the valve seat molding operation, the unbonded section 130 may be formed by omitting the primer or bonding coat in this area of the fluid conduit. In other instances, bonding can be prevented during the molding operation of the valve seat by masking a desired area of the fluid conduit.

It will be quite apparent to those skilled in the art that the unique method of the present invention permits the fabrication of butterfly valve units having great uniformity. By accurately forming the basic valve housing section from a sheet of sheet material and by then employing this housing section in a molding operation, the valves emerging from the same mold exhibit substantially identical operational and structural characteristics. Such uniformity is not normally achieved with conventional cast valve housings. Also, the combination of a molded valve disc with a molded valve seat provides an improved fluid seal not attainable with conventional non-molded discs.

The present invention provides a novel and improved butterfly valve in method and apparatus for constructing the same, and the arrangement and types of components utilized within this invention may be subject to numerous modifications well within the purview of this inventor who intends only to be limited to a liberal interpretation of the specification and appended claims.

I claim:

1. A method for constructing a butterfly valve which includes shaping a section of sheet material to form a valve housing section with an enclosed fluid conduit having a fluid input opening and a fluid output opening, simultaneously molding a layer of substantially resilient material to the inner surfaces of said fluid conduit between said fluid input and output openings to provide a valve seat of predetermined size and a layer of corrosion-resistant moldable material to the outer surfaces of said valve housing section, movably mounting a fluid control means within said fluid conduit between said input and output openings so that such control means is movable to and from a position wherein the peripheral surfaces thereof are in sealed contact with said valve seat.

2. A method for constructing a butterfly valve which includes shaping a section of sheet material to form a valve housing section with an enclosed fluid conduit having a fluid input opening and a fluid output opening, forming a shaft passage substantially perpendicular to the longitudinal axis of said fluid conduit in the walls of said fluid conduit to provide two diametrically aligned passage sections on opposite sides of said conduit, simultaneously molding a layer of substantially resilient material to the inner surfaces of said fluid conduit between said fluid input and output openings to provide a valve seat of predetermined size and a layer of corrosion-resistance moldable material to the outer surfaces of said valve housing section, mounting a valve shaft in said shaft passage for movement relative to said passage, and attaching a fluid control means to said valve shaft within said fluid conduit so that said control means is movable to and from a position wherein the peripheral surfaces thereof are in sealed contact with said valve seat.

3. A method for constructing a butterfly valve which includes shaping a section of sheet material to form a valve housing section with an enclosed fluid conduit having a fluid input opening and fluid output opening, forming a peripheral flange about said input and output openings at each end of said fluid conduit, forming a shaft passage substantially perpendicular to the longitudinal axis of said fluid conduit in the walls of said fluid conduit to provide two diametrically aligned passage sections on opposite sides of said conduit, subjecting said formed sheet material to a single molding operation which includes molding a layer of elastomeric material to the inner surfaces of said fluid conduit to provide a valve seat of predetermined size and to the outer surfaces of the said flanges, said elastomeric material being molded to completely cover the wall surface of said fluid conduit and extend outwardly therefrom to the outer surface of said flanges, and simultaneously molding a corrosion-resistant polymer on the outer surfaces of said valve housing section, mounting a valve shaft in said shaft passaage for movement relative to said passage, and attaching a fluid control means to said valve shaft within said fluid conduit so that the control means is movable to and from a position wherein the peripheral surfaces thereof are in sealed contact with said valve seat.

4. A method for constructing a butterfly valve which includes forming a valve housing section to define an enclosed fluid conduit having a fluid input opening and a fluid output opening, treating a section of the wall of said fluid conduit which is positioned inwardly of said input and output openings and which extends about the complete periphery of said fluid conduit to prevent the bonding of moldable material to said wall during a molding operation, molding a layer of moldable material to the inner surfaces of said fluid conduit between said fluid input and output openings to provide a valve seat of predetermined size bonded by molding to all surfaces but the treated section of said fluid conduit, forming an opening in said valve housing section beneath the unbonded section of said valve seat to provide a fluid conduit extending through said valve housing and beneath said valve seat around the periphery of said fluid conduit, and movably mounting a fluid control means within said fluid conduit so that said control means is movable to and from a position wherein the peripheral surfaces thereof are in sealed contact with said valve seat adjacent the unbonded section thereof.

5. The method for constructing a butterfly valve of claim 4 wherein a layer of corrosion-resistant moldable material is molded to the outer surfaces of the said housing section simultaneously with the molding of the said substantially resilient material to the inner surfaces of said fluid conduit.

6. A method for constructing a butterfly valve which includes flame cutting a sheet of metallic sheet material having at least two substantially parallel surfaces to form a valve housing section having an enclosed fluid conduit extending between said parallel surfaces, forming a shaft passage substantially perpendicular to the longitudinal axis of said fluid conduit in the walls of said fluid conduit to provide two diametrically aligned passage sections on opposite sides of said conduit, subjecting said housing section to a single molding operation which includes molding a layer of elastomeric material to the inner surfaces of said fluid conduit to provide a valve seat of predetermined size and to a section of each of the parallel surfaces of said housing section which surrounds the periphery of said fluid conduit, and simultaneously molding a corrosion-resistant moldable material on the outer surfaces of said valve housing section, mounting a valve shaft in said shaft passage for movement relative to said passage, and attaching a fluid control means to said shaft within said fluid conduit so that the control means is movable to and from a position wherein the peripheral surfaces thereof are in sealed contact with said valve seat.

7. A method for constructing a butterfly valve which includes shaping a section of sheet material to form a valve housing section with an enclosed fluid conduit having a fluid input opening and a fluid output opening, forming a shaft passage substantially perpendicular to the longitudinally axis of said fluid conduit in the walls of said fluid conduit to provide two diametrically aligned passage sections on opposite sides of said conduit, subjecting said valve housing section to a single molding operation which includes molding a layer of elastomeric material to the inner surfaces of said fluid conduit between said input and output openings to provide a valve seat of predetermined size, and simultaneously molding a corrosion-resistant moldable material to the outer surfaces of said valve housing section to form an outer layer on said valve housing section and a peripheral flange about said input and output openings at each end of said fluid conduit, mounting a valve shaft in said shaft passage for movement relative to said passage, and attaching a fluid control means to said valve shaft within said fluid conduit so that the control means is movable to and from a position wherein the peripheral surfaces thereof are in sealed contact with said valve seat.

8. A method for constructing a butterfly valve which includes joining two opposed edges of a section of sheet material to form a valve housing section with an enclosed fluid conduit having a fluid input opening and a fluid output opening, subjecting said valve housing section to a molding operation which includes molding a layer of substantially resilient material to the inner surfaces of said fluid conduit betwen said fluid input and output openings to provide a valve seal of predetermined size and simultaneously molding a layer of corrosion-resistant moldable material to the outer surfaces of said valve housing section, movably mounting a fluid control means within said fluid conduit between said input and output openings so that said control means is movable to and from a position wherein the peripheral surfaces thereof are in sealed contact with said valve seat.

9. A method for constructing a butterfly valve which includes joining two opposed ends of a section of sheet material to form a valve housing section with an enclosed fluid conduit having a fluid input opening and a fluid output opening, securing a peripheral flange about said input and output openings at either end of said fluid conduit, attaching a shaft support block to said valve housing section between said flanges, forming a shaft passage substantially perpendicular to the longitudinal axis of said fluid conduit through said shaft support block and the walls of said fluid conduit to provide two diametrically aligned passage sections on opposite sides of said conduit, subjecting said housing section to a single molding operation which includes molding a layer of elastomeric material to the inner surfaces of said fluid conduit to provide a valve seat of predetermined size and to the outer surfaces of said flanges, said elastomeric material being molded to completely cover the wall surface of said fluid conduit and extend outwardly therefrom to the outer surfaces of said flanges, and simultaneously molding a corrosion-resistant moldable material on the outer surfaces of said valve housing section, mounting a valve shaft in said shaft passage for movement relative to said passage, and attaching a fluid control means to said valve shaft within said fluid conduit so that the control means is movable to and from a position wherein the peripheral surfaces thereof are in sealed contact with said valve seat.

10. A butterfly valve comprising a valve housing section of sheet material having at least two substantially parallel surfaces and including a fluid conduit extending between the parallel surfaces thereof, the surfaces of said fluid conduit being rough cut and irregular, a shaft passage formed in said housing section and extending on either side of said fluid conduit, a molded valve seat of resilient, moldable material molded in place within said fluid conduit to the irregular surfaces thereof, said valve seat having a smooth inner surface which defines a fluid passage accurately centered within said valve housing section and an irregular outer surface which fills the irregularities in the surface of said fluid conduit, a molded fluid control means within said fluid passage, said molded fluid control means having an outer edge molded to conform to the configuration of said valve passage and cooperating with said valve seat to close said passage, a valve shaft connected to said molded fluid control means, said shaft extending through said shaft passage, and a molded layer of anti-corrosive moldable material molded to the exposed surfaces of said housing section not covered by said valve seat.

11. The butterfly valve of claim 10 wherein molded flanges are formed on said valve housing section at the periphery of said fluid conduit, said molded flanges being formed from the anti-corrosive material forming the outer molded layer on said housing section.

12. A butterfly valve comprising a metallic valve housing section having a fluid conduit extending therethrough, the surfaces of said valve housing section and fluid conduit being irregular and unfinished and the outer exposed surfaces of said valve housing being coated with an outer layer of molded in place, corrosion-resistant moldable material, said molded outer layer terminating at either side of said valve housing section at an annular line spaced from the periphery of said fluid conduit, a shaft passage formed in said housing section and extending on either side of said fluid conduit, a molded valve seat of elastomeric moldable material molded in place within said fluid conduit to the irregular surfaces thereof and extending outwardly from said fluid conduit onto the surface of said metallic valve housing to the terminus of said outer layer to form annular gaskets on either side of said valve housing about the periphery of said fluid passage, said valve seat having a smooth inner surface which defines a fluid passage within said valve housing section and an irregular outer surface which fills the irregularities in the surface of said fluid conduit, a molded fluid control means within said fluid passage, said molded fluid control means being formed of elastomeric material and having an outer edge molded to conform to the configuration of said valve passage, said outer edge cooperating with said valve seat to close said passage, and a valve shaft connected to said molded fluid control means, said shaft extending through said shaft passage.

13. The butterfly valve of claim 12 wherein said housing section is formed from flame cut steel sheet material.

14. The butterfly valve of claim 12 wherein said housing section is formed by a sheet of metallic sheet material which is cut to provide pairs of projections spaced along the periphery thereof, each such pair of projections being formed to define a bolt opening.

15. The butterfly valve of claim 12 wherein said metallic valve housing section is formed by a sheet of sheet metal, the opposed edges of which are joined to define a fluid conduit.

16. The butterfly valve of claim 15 wherein flanges are secured to either end of said housing section about the periphery of said fluid conduit.

17. The butterfly valve of claim 15 wherein shaft support means are secured to said metallic housing section, said shaft support means including a shaft support block having a passage formed therethrough, said passage being diametrically aligned with the shaft passage formed in said housing section, and bushing means in said passage, said bushing means being adapted to receive and support said valve shaft.

References Cited by the Examiner
UNITED STATES PATENTS

| | | | |
|---|---|---|---|
| 1,858,927 | 5/1932 | Gray et al. | 29—157.1 |
| 3,122,353 | 2/1964 | Killian | 251—306 |
| 3,186,682 | 6/1965 | Pierson et al. | 251—306 |

M. CARY NELSON, *Primary Examiner.*

R. C. MILLER, *Assistant Examiner.*